United States Patent [19]

Sanford et al.

[11] Patent Number: 4,927,187
[45] Date of Patent: May 22, 1990

[54] FITTING WITH LOCK WIRE FEATURE

[75] Inventors: David L. Sanford, Stuart; Gary W. Douglass, Palm Beach Gardens, both of Fla.

[73] Assignee: United Technologies Corporation, Hartford, Conn.

[21] Appl. No.: 427,385

[22] Filed: Oct. 26, 1989

[51] Int. Cl.⁵ .............................................. F16L 35/00
[52] U.S. Cl. ........................................ 285/80; 285/92; 285/158; 285/330; 285/917
[58] Field of Search .................... 285/92, 80, 150, 330, 285/917

[56] References Cited

U.S. PATENT DOCUMENTS 2,907,590 10/1959 Oswald .................................. 265/80
4,655,479 4/1987 Farr ....................................... 265/92

Primary Examiner—Dave W. Arola
Attorney, Agent, or Firm—Norman Friedland

[57] ABSTRACT

A serrated collar having an inner flange portion adapted to be trapped between the nut and threaded adapter of a Rosan fitting and an outer flange portion having a hole for accommodating a lock or safety wire that is splined to the outer spline of the lock ring for obviating the necessity of locating the lock wire hole directly into the casing.

3 Claims, 2 Drawing Sheets

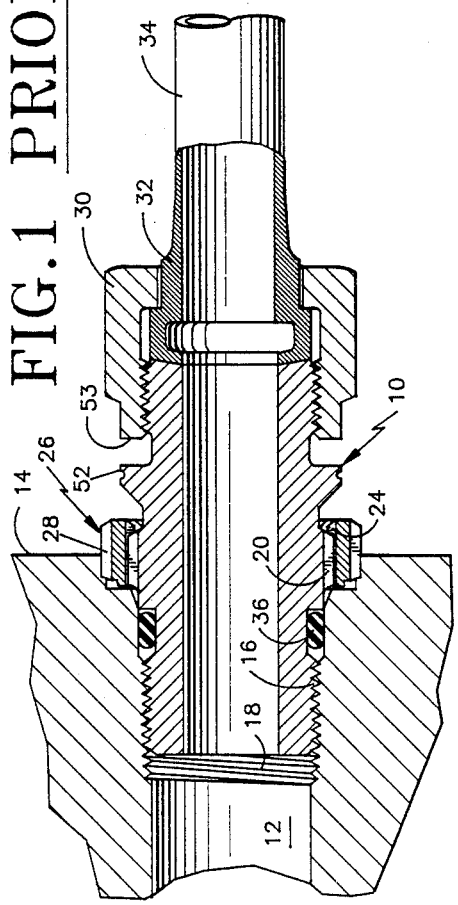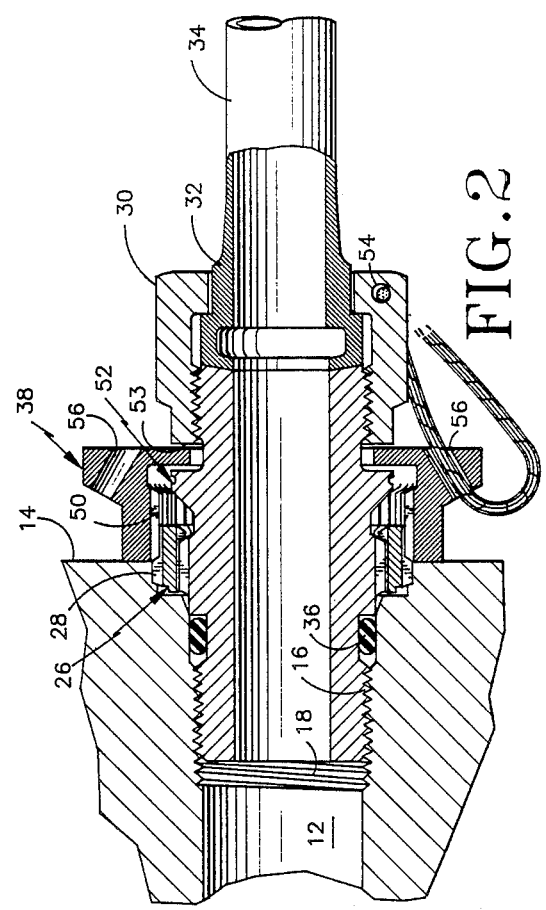

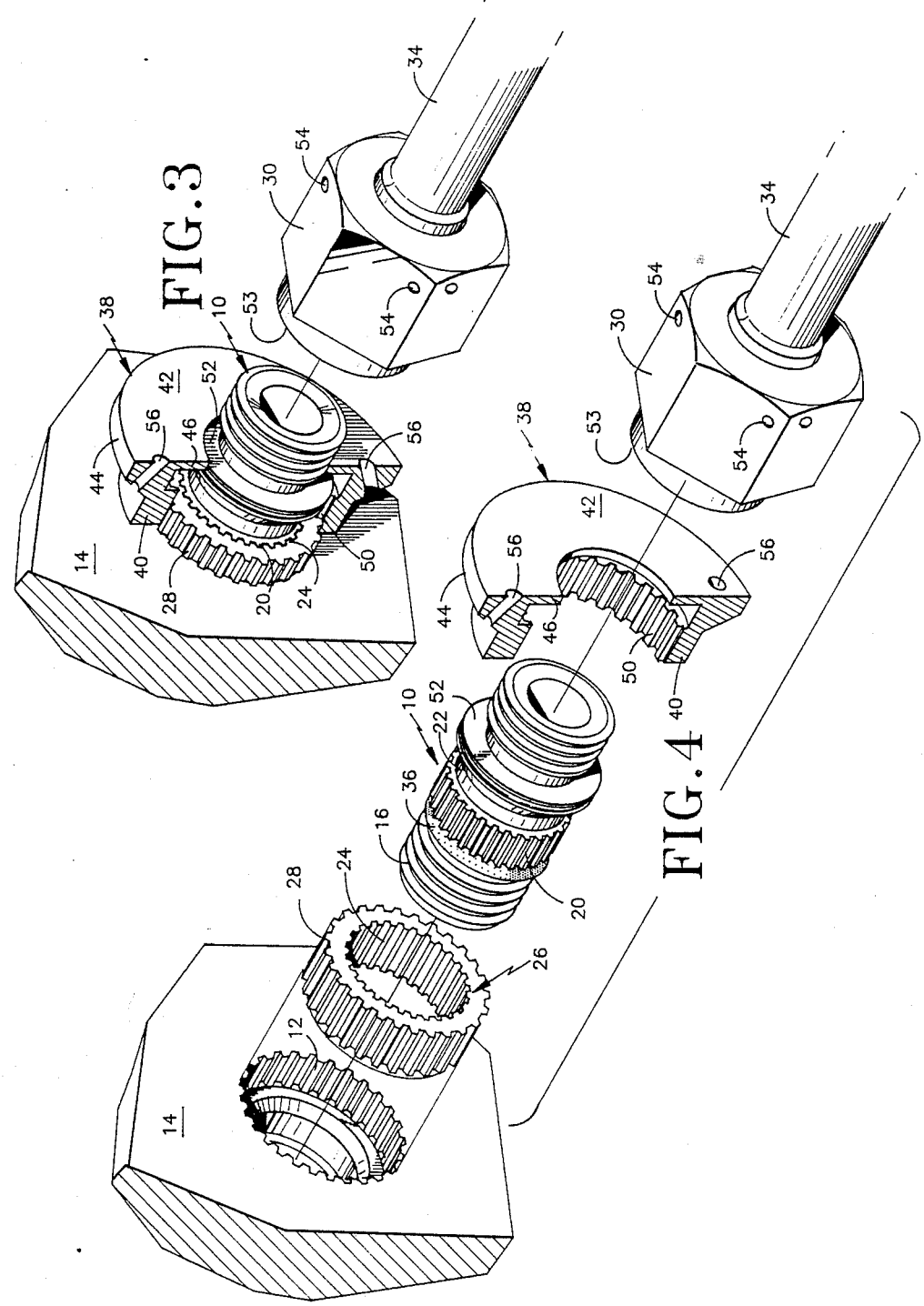

FITTING WITH LOCK WIRE FEATURE

The invention was made under a U.S. Government contract and the Government has rights herein.

TECHNICAL FIELD

This invention relates to fluid couplings and particularly to means for accommodating lock wire.

BACKGROUND ART

"Rosan" fittings for connecting fluid lines which are available from Rexnord, Specialty Fastener Division, are well-known and are illustrated in FIG. 1. Essentially, a threaded adapter is threadably secured in the boss of a case or housing where fluid egresses or ingresses. A tube nut secures the connecting tube at its ferrule. As noted, a hole is drilled through the side wall of the nut and is adapted to receive the lock wire. The other end of the lock wire is typically secured to the housing by a hole formed directly in the wall of the case or housing. The threaded adapter is prevented from rotating by a lock ring which has a spline on its inner diameter engaging a complementary spline formed on the outer diameter of the threaded adapter. Splines are preformed in an enlarged recess formed on the front end of the passageway in the boss of the case or housing. The splines are either formed by a broaching tool or by electrical discharge milling process (EDM). The lock ring carries splines complementing the splines in the recess which serves to prevent the fitting from rotating. Obviously, from the foregoing, it is apparent that the lock ring and lock wire are antirotation mechanisms that prevent the fitting from dislodging. In some installations, the lock wire is optional.

However, for safety purposes lock wire is often used, notwithstanding the fact that industry would rather do without. While locating the lock wire hole in the housing itself has been acceptable in some applications, in others it is not. The hole in the housing obviously weakens the structure to some degree and in certain applications the housing cannot accommodate a lock wire hole.

We have found that we can obviate the problem noted above by providing a serrated ring adapted to engage the outer spline of the lock ring which has an upper flange or indent that has a lock wire hole adapted to receive the lock wire passing through the hole in the nut. The upper flange extends radially inwardly and is nested in a reduced diameter on the adapter between the inner end of the tube nut and a shoulder formed on the adapter adjacent the recess.

DISCLOSURE OF INVENTION

An object of this invention is to provide an improved fluid fitting.

A feature of this invention is to trap a serrated collar or ring having lock wire provisions between a shoulder formed in the threaded adapter and the end of the locking nut that engages the spline formed on the lock ring that is splined in the housing boss preventing rotation of the threaded adapter.

A feature of this invention is to provide a self-contained member for a state-of-the art fitting for securing lock wire.

The foregoing and other features and advantages of the present invention will become more apparent from the following description and accompanying drawings.

BRIEF DESCRIPTION OF THE DRAWINGS

FIG. 1 is a view in section illustrating the prior art fitting mounted in the boss of a housing.

FIG. 2 is a view identical to FIG. 1 with the exception that the details of the invention are included.

FIG. 3 is an exploded perspective view showing the fitting in a partially assembled condition; and FIG. 4 is an exploded perspective view showing the details of the fitting and the invention.

BEST MODE FOR CARRYING OUT THE INVENTION

As was mentioned in the foregoing, the commercially available Rosan fitting comprises threaded adapter 10 threadably secured in the bore 12 formed in the boss 14 of a case where fluid is being admitted or retrieved. The threaded adapter 10 carries thread 16 complementing threads 18 found in bore 12. Splines 20 formed on the outer diameter of the shank 22 serve to engage complementary splines 24 formed on the inner diameter of lock ring 26. Splines 28 formed on the outer diameter of lock ring 26 fit into complementary splines formed in the walls of case 14 at an increased diameter recess formed on the face of casing 14 at the bore 12. Splines in the boss may be formed by any suitable means, such as by electrical discharge milling or by a broaching process.

A tube nut 30 engages the ferrule 32 of tube 34 being coupled to the fitting and is threadably secured to complementary threads formed in the remote end of the threaded adapter 10. An "0" ring 36 is suitably attached to the adapter 10 and contacts the surface of bore 12 to prevent leakage from the outer surface of adapter 10.

If a lock wire is specified for use with the above described fitting, holes drilled in the side wall of nut 30 and directly in the case 14 are adapted to receive lock wire.

In accordance with this invention the hole drilled directly in the case typically used in the lock wire installation is obviated by incorporating the collar 38 shown in FIGS. 2, 3, and 4. As noted from these drawings collar 38 consists of a ring body member 40 which carries a flange 42 having a first portion 44 extending radially outwardly and an inner diameter portion 46 extending radially inwardly. The flange, while shown to be a complete hoop could be fabricated in lobes or reduced area portions, depending on the particular application. It being understood that the outwardly extending portion being sufficiently large to accommodate a hole for receiving the lock wire and the inwardly extending portion 46 being adapted to be trapped when assembled.

The inner diameter of the ring body portion is formed with serrations 50 which complement the splines 28 of lock ring 26.

In the assembled condition, the splines 28 of lock ring 26 extend beyond the face of case 14 and the serrations 50 engage these splines. The inward projection 46 is trapped between an enlarged diameter portion 52 formed on the wall of threaded adapter 10 and the end face 53 of nut 30. Drilled holes 54 and 56 formed in the side wall of nut 30 and the flange 42 of collar 38, respectively, serve to accommodate the lock wire.

Although this invention has been shown and described with respect to detailed embodiments thereof, it will be understood by those skilled in the art that various changes in form and detail thereof may be made without departing from the spirit and scope of the claimed invention.

We claim:

1. A safety wire retention device for a fitting to adapt a fluid connecting tube having an opening to a casing, said fitting including a ferrule attached to one end of said tube, an elongated tubular adapter having a central opening communicating with the opening in said tube, said tubular adapter being threaded at each end and one end threaded to a threaded tube nut for securing said ferrule to said tubular adapter and the other threaded end threadably attaching said adapter to said casing, said tubular adapter including an enlarged diameter portion spaced from one of said threaded ends and together with said threaded tube nut defining an annular space, a lock ring having internal splines and external splines, said tubular adapter having a splined portion on the outer diameter thereof being in splined engagement with said internal splines of said lock ring, said casing being in splined relation with said external splines, said external splines extending beyond said casing, said safety wire retention device comprising a collar surrounding said tubular adapter and having splines formed on the inner diameter of said collar engaging said external splines of said lock ring and an inner flange portion extending radially inwardly on said collar being trapped in said space provided by said enlarged diameter portion and one of said threaded ends, the end of said tube nut and an outer flange portion extending radially outwardly on said collar having a drilled hole adapted to receive the safety wire extending from a hole formed in said tube nut.

2. A safety wire retention device as in claim 1 wherein said inner flange portion is a full hoop.

3. A safety wire retention device as in claim 1 wherein said outer flange portion is a full hoop.

* * * * *